United States Patent [19]
Flood et al.

[11] Patent Number: 5,963,448
[45] Date of Patent: Oct. 5, 1999

[54] INDUSTRIAL CONTROLLER HAVING REDUNDANCY AND USING CONNECTED MESSAGING AND CONNECTION IDENTIFIERS TO ENABLE RAPID SWITCHOVER WITHOUT REQUIRING NEW CONNECTIONS TO BE OPENED OR CLOSED AT SWITCHOVER

[75] Inventors: Mark A. Flood, Mayfield Heights; Mark E. Taylor, Chesterland, both of Ohio

[73] Assignee: Allen-Bradley Company, LLC, Milwaukee, Wis.

[21] Appl. No.: 08/878,292

[22] Filed: Jun. 18, 1997

[51] Int. Cl.[6] ...................................................... G06F 11/16
[52] U.S. Cl. ........................ 364/187; 714/6; 364/140.02
[58] Field of Search ............................... 395/182.04, 620, 395/185.07, 182.11, 200; 364/131–134, 187, 140.02; 371/9.1; 370/60, 60.1, 94.1; 714/6

[56] References Cited

U.S. PATENT DOCUMENTS

| | | | |
|---|---|---|---|
| 4,956,270 | 9/1990 | McLaughlin et al. | 364/187 |
| 5,093,824 | 3/1992 | Coan et al. | 370/16 |
| 5,313,386 | 5/1994 | Cook et al. | 364/187 |
| 5,485,455 | 1/1996 | Dobbins et al. | 370/60 |
| 5,649,089 | 7/1997 | Kilner | 395/182.04 |

*Primary Examiner*—Meng-Ai T. An
*Assistant Examiner*—John Ciccozzi
*Attorney, Agent, or Firm*—Keith M. Baxter; John M. Miller; John J. Horn

[57] ABSTRACT

A redundant controller employs connection-based messaging to ensure reliability and determinacy in communications. The need to close connections and reopen connections with a backup module when control switches from a primary controller to a secondary controller is eliminated by keeping the secondary controller updated as to the connections that have been opened and having the secondary controller assume the connection identification numbers of the primary controller upon switch-over.

12 Claims, 5 Drawing Sheets

INDUSTRIAL CONTROLLER HAVING REDUNDANCY AND USING CONNECTED MESSAGING AND CONNECTION IDENTIFIERS TO ENABLE RAPID SWITCHOVER WITHOUT REQUIRING NEW CONNECTIONS TO BE OPENED OR CLOSED AT SWITCHOVER

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers for real time control of industrial processes and in particular to industrial controllers having redundant functional modules to provide a high level of reliability and availability.

Controller Architecture

Industrial controllers are special purpose computers used for controlling industrial processes and manufacturing equipment. Under the direction of a stored program, the industrial controller examines a series of inputs reflecting the status of the controlled process, and changes outputs effecting control of the process. The inputs and outputs are most simply binary, that is on or off, however analog inputs and outputs assuming a continuous range of values are also available.

During execution of the control program, values of the inputs and outputs exchanged with the controlled process pass through an I/O table. The values of inputs in the I/O table are asynchronously updated from the controlled process by dedicated scanning circuitry. The scanning circuitry also asynchronously writes values of the outputs in the I/O table to the controlled process. During execution of the control program, the processor may simply access the I/O table rather than needing to communicate directly with the control process.

Typically, an industrial controller will be customized to the particular process it is controlling both by the writing of new control software that may be stored in the controller's memory and by changing the hardware configuration of the controller to match the control task. The ability to configure the controller hardware is provided economically by dividing the industrial controller into a number of control modules, each performing a different function. Particular control modules needed for the control task may then be selected and linked together on a common backplane within a rack. The control modules may include processors, power supplies, network communication modules, and I/O modules exchanging input and output signals directly with the controlled process. A typical hardware modification may involve the adding of additional I/O modules so as to be able to control additional equipment.

Different control modules of the industrial controller may be spatially distributed along a common communication link in several racks. It may, for example, be efficient to locate certain I/O modules in close proximity to a portion of the control equipment away from the remainder of the controller. Data is communicated with these remote modules over a common communication link.

Connected Messaging

Unlike conventional computer technology, industrial controllers must provide real time deterministic control. Loss or undue delay in the transmission of the data among control modules, either on the backplane or a common link, cannot be tolerated as it may cause catastrophic failure of the controlled process.

In order to provide predicable and highly reliable data communication in an industrial controller, it is known to use "connected messaging". In connected messaging, a particular control module of the industrial controller must "open" a connection with another control module of the industrial controller prior to sending or receiving data. This process of opening a connection reserves communication link resources for use by the control modules to ensure that the data transfer will not be delayed or obstructed. Two important link resources reserved by the opening of a connection are buffer space in the respective control modules to hold the transmitted data at the rate expected and a scheduled slot in the communication link bandwidth.

In a typical opening of a connection, a first control module will send an OPEN request to a second control module indicating the needed link resources. The second control module will then reply confirming the availability of link resources for the opened connection and providing a unique connection identification number "CID". When data is transmitted on the connection, the CID accompanies each packet of data and provides a means for connecting the packets and for rapidly routing the packets to their reserved buffers. The CID also permits an efficient scheduling of the packet in a queue for forwarding it through other nodes to its final destination.

A communication link, such as the common communication link or the backplane, will have a limited number of possible open connections. For this reason, provision is made both for closing connections that are no longer needed. Opening and closing a connection is not instantaneous and thus, after initialization of the controller, is normally performed a few connections at a time in between the flow of control data.

Redundant Controller Operation

The reliability and availability of an industrial controller may be increased by providing redundant control modules in the industrial controller. For example, additional secondary processor modules may be added to a rack or placed in a separate rack to provide a backup for the primary processor module. A failure of the primary processor module then triggers a switch-over to the secondary processor module.

Any switch-over between the primary and secondary module must occur rapidly so as to not unduly disrupt the controlled process. A significant obstacle to this transfer is the need for the controller to have an up to date I/O table holding the current state of the many inputs to the controlled process. The amount of time necessary to cross load the I/O table from the primary processor to the secondary processor may be prohibitive or impossible in the event of a failure of the primary processor. For this reason, it is usually desirable that the secondary processor "listen in" on communications to the primary processor to maintain its I/O table current.

The use of connected messaging creates additional obstacles to rapid switch-over between redundant processors. First, the very strength of connected messaging in precisely characterizing the consumer and producer of the message in a connection makes listening in by the secondary processor to maintain its I/O table difficult. While connected messaging allows the broadcast of data to multiple receiving control modules, this type of connection is not preferred, and may undesirably require reprogramming of the connections of the control program when redundancy is added.

Second, the closing out of connections from the primary processor and reopening of new connections to the secondary processor requires a significant amount of time that interferes with the rapid switch-over of control. Allowing connections to the primary controller to expire is normally not an option as it will trigger a fail state.

BRIEF SUMMARY OF THE INVENTION

The present invention permits the use of connected messaging in an industrial controller having redundancy without extensive revision of the control program or undue delay in the switch-over between control modules should that occur. Generally, in the invention, the primary control module opens connections and forwards a list of the connections to the secondary control module. The list includes the connection identification numbers. The secondary control module, at the time of switch-over, may then simply assume those connections without closing or opening new connections by using the same connection identification numbers.

Specifically, the present invention provides a method of operating an industrial controller with redundancy and with connected messaging where the industrial controller includes at least one primary and one secondary control module, the latter providing a redundant function. The method includes the steps of opening a connection between a primary control module and another control module, the connection being associated with a connection identification number. The connection identification number is then transmitted from the primary control module to the secondary control module. Prior to a switch-over between the primary and secondary control modules, data is transmitted from the primary control module to the other control module using the connection identification number without transmission of data by the secondary control modules using the connection identification number. After a switch-over time, data is transmitted from the secondary control module to the other control module using the previously transmitted connection identification number. The primary control module, after switch-over, is prevented from making transmissions using the connection identification number.

Thus it is one object of the invention to permit connected messaging to be efficiently used in an industrial controller that also provides for redundancy in its hardware components. Because at the time of switch-over, no connections need to be opened or closed, the switch-over process is completed rapidly.

The first and second control modules may each communicate on local links, typically their backplanes, with system backup modules which are connected to one another with a dedicated backup link. The step of transmitting the connection identification number from the primary control module to the secondary control module may include the steps of transmitting the connection identification number from the primary control module over the local link to the first system backup module, then over the backup link to the second system backup module, then over the local link to the secondary controller.

It is thus another object of the invention to provide a method of transferring connection identification numbers without interference with the ongoing communications between control modules executing the control program. The use of a dedicated backup link allows this information to be segregated from the common link.

Prior to the switch-over time, the secondary module may receive data from the other control module via the primary module retransmitting that data to the secondary control module.

Thus it is another object of the invention to permit an ongoing updating of the secondary control module's I/O table for the purpose of switch-over without the need to fundamentally affect the nature of the connections between the primary control module and the other control module. By allowing the primary control module to rebroadcast this information, possibly through the backup link, the redundancy is invisible to the other module.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE INVENTION

Controller Hardware

Figure 1:
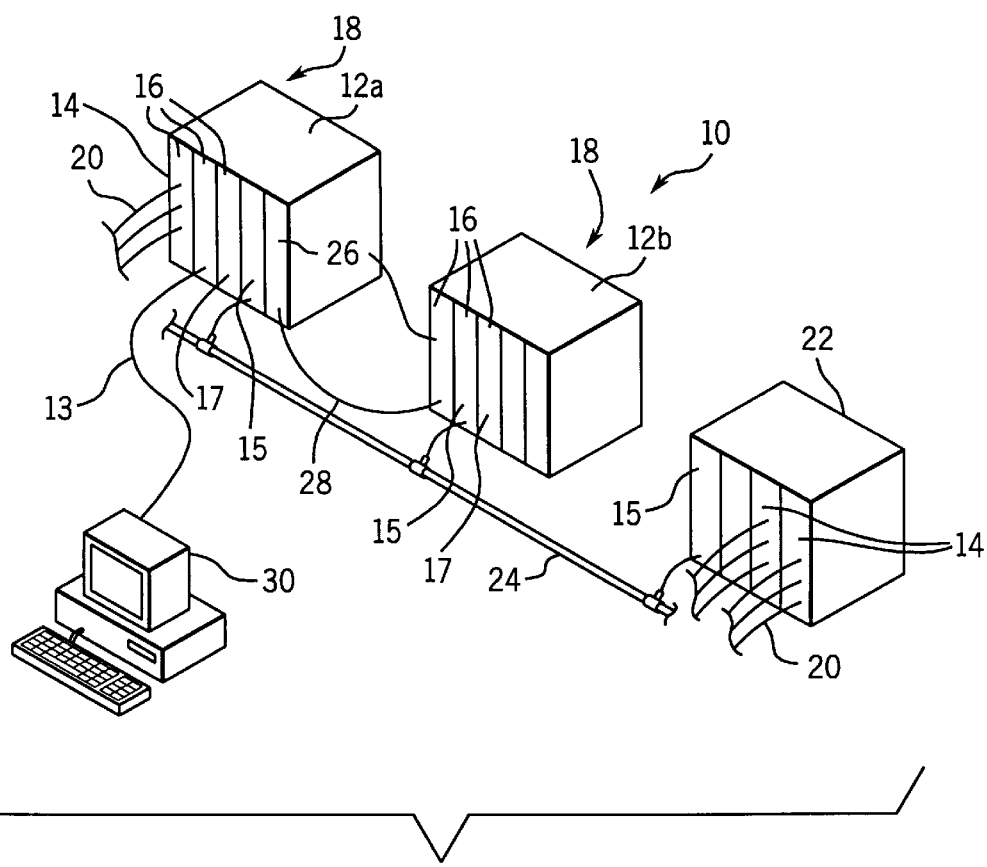
FIG. 1 is a simplified perspective view of an industrial controller having a primary and secondary rack, each including control modules connected by a backplane and a remote I/O rack.

Referring to FIG. 1, an industrial control system 10 of the present invention includes a primary controller rack 12a and a secondary controller rack 12b and a remote I/O rack 22 interconnected by a common link 24. Racks 12a or 12b may also be connected by a separate communication channel 13 to a programming terminal 30 being of conventional desktop computer design.

The primary controller rack 12a and the secondary controller rack 12b hold a number of control modules 16 which communicate electrically via a separate backplane 18 composed of multiple conductors running along the back of each of the racks 12.

Among the control modules 16 may be a processor module 17 for executing the user program to control the controlled process, and I/O modules 14 for connecting to input and output signals of a controlled process (not shown) via lines 20. Also included may be a communication module 15 permitting communication between the racks 12a and 12b as well as the remote I/O rack 22 along a common link 24. The remote I/O rack 22 includes multiple I/O modules 14 communicating with the controlled process also through lines 20.

Each of the racks 12 may also include a system backup module 26 communicating with each other over a dedicated link 28. The system backup modules coordinate the operation of the modules 16 of the two racks 12, so that one set of modules 16 may back up the modules 16 of the other rack 12 in the event of failure.

Figure 2:
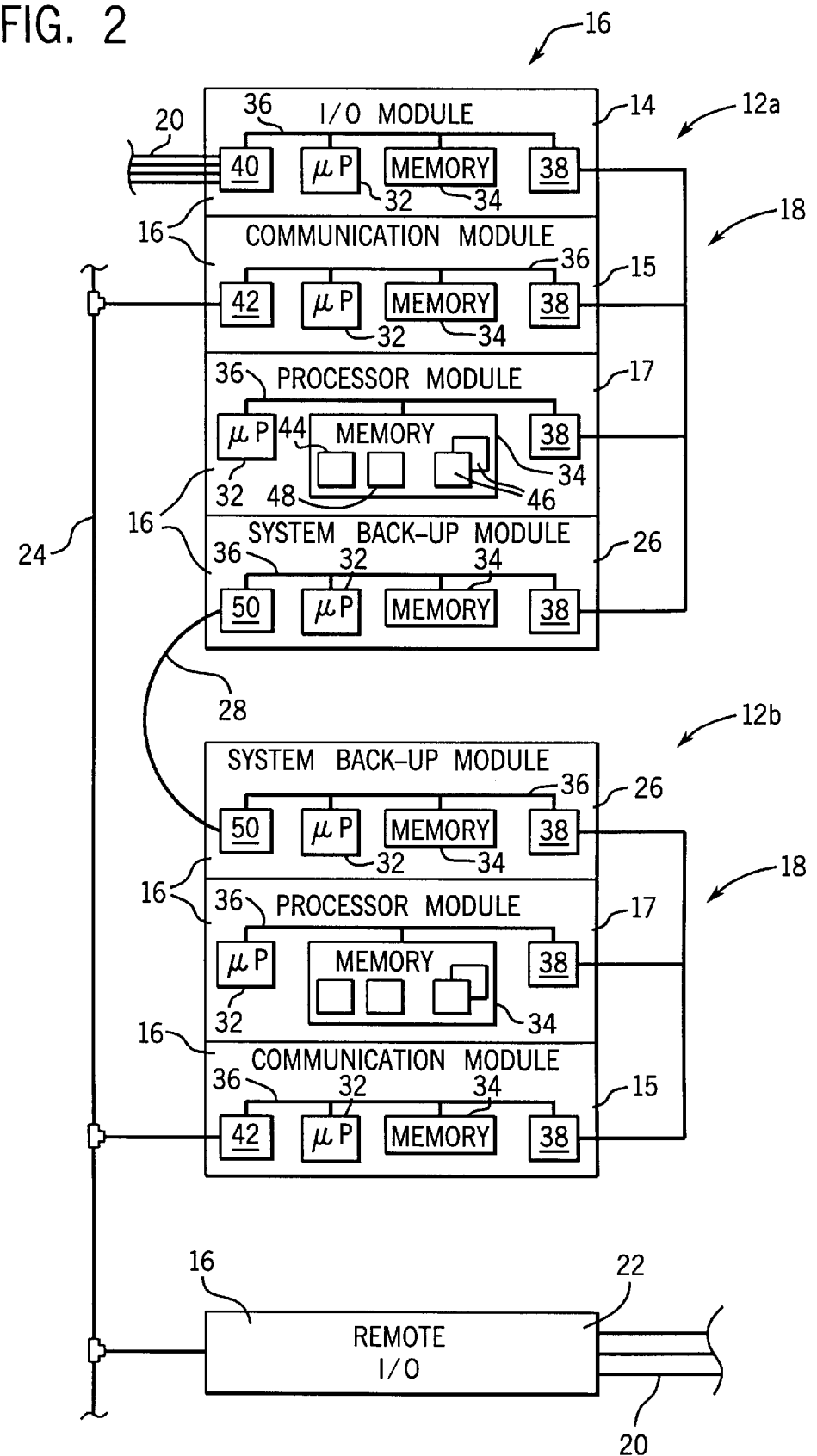
FIG. 2 is a block diagram of the controller of FIG. 1 showing internal components of the control modules of FIG. 1.

Referring now to FIG. 2, a typical control module 16, such as I/O module 14 in rack 12a, includes a processor 32 communicating with a memory 34 via an internal bus 36. The memory 34 may include volatile and nonvolatile type memory circuits as are well understood in the art. The bus 36 also communicates with a backplane interface circuit 38 providing an interface to the backplane 18 to the other control modules 16. Also connected to the internal bus 36 is I/O circuitry 40 for communicating with lines 20 and with the controlled process.

Generally the memory 34 in the I/O module includes an operating program for the processor 32 which allows the I/O module 14 to function to read and write to the lines 20 according to commands and data received over the backplane 18 from the processor module 17.

The communication modules 15 are similar to the I/O module 14 in that they include a processor 32, memory 34 holding an operating system 44, backplane interface circuit 38, and internal bus 36. Unlike the I/O module 14, however, the communication module does not include I/O circuitry 40 but instead includes link interface circuitry 42 connecting the communication module 15 to the common link 24 as has been described. The communication modules 15 thus may generally act as a bridge for information between the common link 24 and the backplane 18.

The processor module 17 also includes a processor 32, memory 34 and backplane interface circuit 38 connected on a common bus 36, however, without I/O circuitry 40 or link interface circuitry 42. The memory of the processor module holds not only an operating system program 44 but also one or more user programs 46 describing the control of the process and an I/O table 48 holding current values of inputs and outputs received through the I/O module 14 and the remote I/O rack 22. During operation of the industrial control system 10, the processor 32 executes the user program 46 to read and write to the I/O table 48. The input values of the I/O table 48 are then updated, asynchronously, through specialized circuitry of the processor 32 communicating with I/O modules 14 by a backplane 18 and common link 24. Similarly, output values in the I/O table 48 are asynchronously output to the controlled process via the I/O modules 14.

The system backup module 26 again has a processor 32, memory 34, and backplane interface circuit 38 communicating on a common bus 36. The system backup modules 26 also include a link interface circuit 50 connected to dedicated link 28 between the system backup modules 26 as has been described. The memory 34 holds an operating program for the system backup module 26 whose operating will be described below.

Remote I/O rack 22 includes generally link interface circuitry 42 for receiving and transmitting information on the common link 24 and a processor and memory connected on an internal bus (not shown) as will be understood to those of ordinary skill in the art.

Operation of the Controller

Figure 3A:
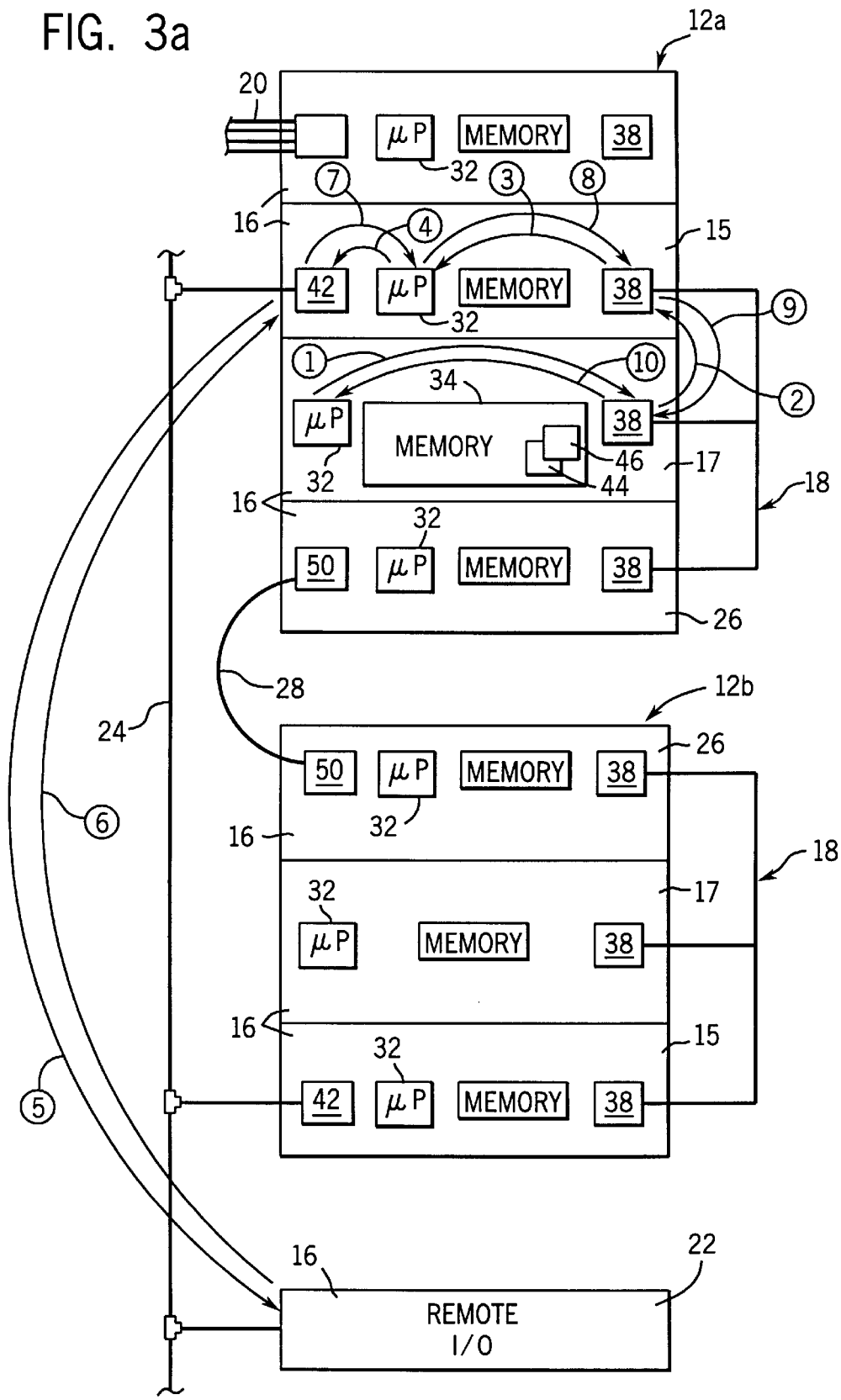
FIGS. 3a and 3b are a simplified versions of FIG. 2, showing the paths of data flow during the opening of a connection by a control module of the primary rack.

Referring now to FIG. 3a, during normal operation, the rack 12a will provide a primary control of the industrial process and rack 12b will provide a backup of rack 12a. For this reason, rack 12b includes each of the modules of rack 12a. In the event of a fault in one module 16 in the primary rack 12a or upon the receipt of particular instructions transmitted by the user, control may be transferred to the secondary rack 12b with the modules of the primary rack. This switch-over is coordinated by the system backup modules 26 which may detect faults, module removals or instructions from the user and may send instructions to the various control modules 16 over the backplanes 18 to activate or deactivate those modules as is necessary. To facilitate switch-over, the same user program 46 stored in the memory 34 of the primary rack 12a is stored in the memory 34 of the processor module 17 of the secondary rack 12b.

The processor module 17 uses a connected messaging system on backplane 18 and on common link 24 for communication with other modules 16 and the remote I/O rack 22. Connections, established in connected messaging, pre-allocated communications resources (including hardware and bandwidth) for a message to be transmitted to ensure timely delivery of messages without loss of data. This connection process requires that prior to data transmission, connections be opened between the various modules 16 as initiated by one of the communicating modules 16, for example, the processor module 17.

Figure 4:
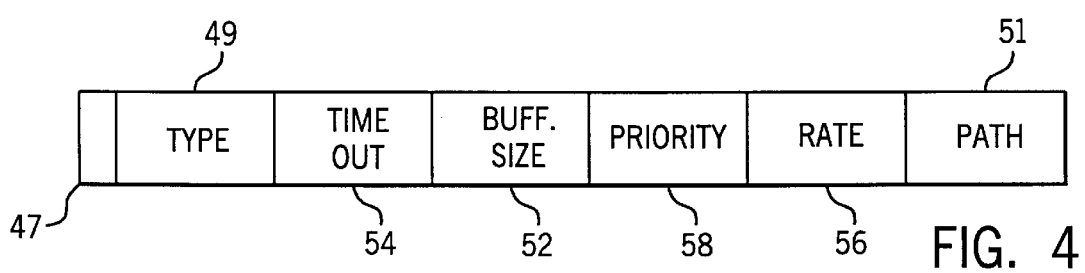
FIG. 4 is a schematic representation of an open connection message used in a connected messaging system.

Referring to FIGS. 3a and 4, a connection, for example, may be initiated by the processor module 17 under the direction of a user program 46 initializing the network. Per instructions in the user program 46 and routines in the operating system program 44, the processor 32 builds an open connection message 47 and passes it to the backplane interface circuit 38. For clarity in the figures, the message flows in this process are indicated by arrows labeled with consecutive circled numbers. These numbers are indicated in the specification by placing the number in parenthesis. Thus the passing of the open connection message 47 to the backplane 18 is indicated by arrow (1).

The backplane interface circuit 38 for the processor module 17 then passes the open connection message 47 to the communication module 15 as indicated by arrow (2) via the backplane interface circuit 38 for the communication module 15. The open connection message 47 is then passed to the processor 32 of the communication module 15, as indicated by arrow (3), which formats the message to be suitable for the common link 24. The open connection message 47 is then transmitted as indicated by arrow (4) through the link interface circuitry 42 along the common link 24 as indicated by arrow (5).

Referring particularly to FIG. 4, the open connection message 47 includes a type portion 49 designating it as an open connection message to be interpreted as such by the other control modules 16. The open connection message 47 also includes path information 51 describing the path of the open connection message 47 to its destination for more complex network topologies that may include bridges and the like. In this case, the path information simply designates the physical address of the I/O rack 22.

The open connection message 47 also carries with it information characterizing the data that will be transmitted on the connection (e.g., its size and rate) so that the necessary network bandwidth and buffer space may be reserved. In particular, open connection message 47 includes a buffer size portion 52 indicating the size of each packet of the message and used by the link interface circuitry 42 of the receiving modules 16 to allocate sufficient amount of memory 34 to temporarily store the packet as they are received. Buffer size portion 52 is critical because if insufficient buffer is available for a particular connection, new incoming packets will be rejected or will write over the memory of previous packets, possibly of a different message, causing a data loss unacceptable in a deterministic industrial control system.

The open connection message 47 also includes a time-out value 54 which provides a period of time after which the message is presumed to have ended so that its node resources can be reallocated to other messages. The time-out value is generally set equal to four times the packet rate data 56 as will be described to ensure that time out does not occur while packet information is still being transmitted. The time out value ensures that the unused buffer of the node is free to be used by new messages.

For communication links which permit allocation of portions of their bandwidth to particular connections, the open connection message 47 will also include packet rate data 56. Rate data 56 allows the scheduling of packets of the messages on the connection to guarantee a given packet transmission rate and thus to improve the determinism of the controlled process. A variety of different scheduling mechanisms may be used to ensure the necessary data rate. In the preferred embodiment, the common link 24 may be divided into periodic time intervals and the rate information may pre-allocate certain numbers of these periods, e.g., every period, every other period, every fourth period, and the like. Similarly, the open connection message 47 may include a priority ranking 58 permitting packets of connections to be ranked according to priority for messages that are not scheduled to pre-allocated portions of the network bandwidth.

The I/O rack 22, upon receiving the open message, checks to ensure that it can accommodate requirements of the connection. If not, a rejection of the connection is forwarded as will be understood to those of ordinary skill in the art. Otherwise, the I/O rack 22 responds over the common link 24 as indicated by arrow (6) with a reply message. The reply message importantly holds a connection identification number 62 which will be used to uniquely identify packets of the messages of that connection on the common link 24. Both the transmitting and receiving control modules 16 of the connection maintain a list including such connection identification numbers for use.

Figure 5:
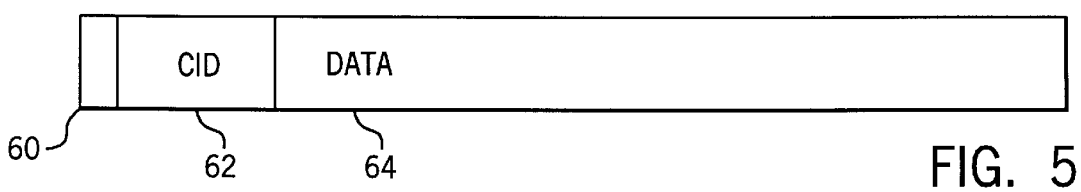
FIG. 5 is a schematic representation of a data message in a connected messaging system.

Generally, messages 60 as indicated in FIG. 5, transmitted on the connection include a header portion having the connection identification number 62 followed by a data portion 64 containing the data for that particular message. All modules 16 connected to the common link 24 will monitor messages 60 for connection identification numbers 62 on their connection identification number list. When one of the messages 60 matches a connection identification number 62 on its list, the module 16 will accept the message 60 and use the connection identification number to index buffer space and (in the event of retransmission) to reschedule the packet for retransmission at the desired rate and priority. Using the connection identification number 62 simplifies the processing of multiple packets related to different connections and allows the packets to be reassembled after delivery.

Referring again to FIG. 3a, when the communication module 15 receives the reply message indicated by arrow (6), the link interface circuitry 42 sends the connection information of the reply back to the processor 32 as indicated by arrow (7) which adds the connection identification number to its list. The processor 32 then generates a reply message 60 with a separate connection identification number 62' and the same data 64 and sends it to the backplane interface circuit 38 as indicated by arrow (8) for transmission over the backplane 18 as indicated by arrow (9) to the backplane interface circuit 38 of the processor module 17.

Arrow (10) indicates the subsequent transmission of the reply message to the processor 32 of the processor module 17 which adds the connection identification number to its memory and allocates appropriate link resources.

Figure 3B:
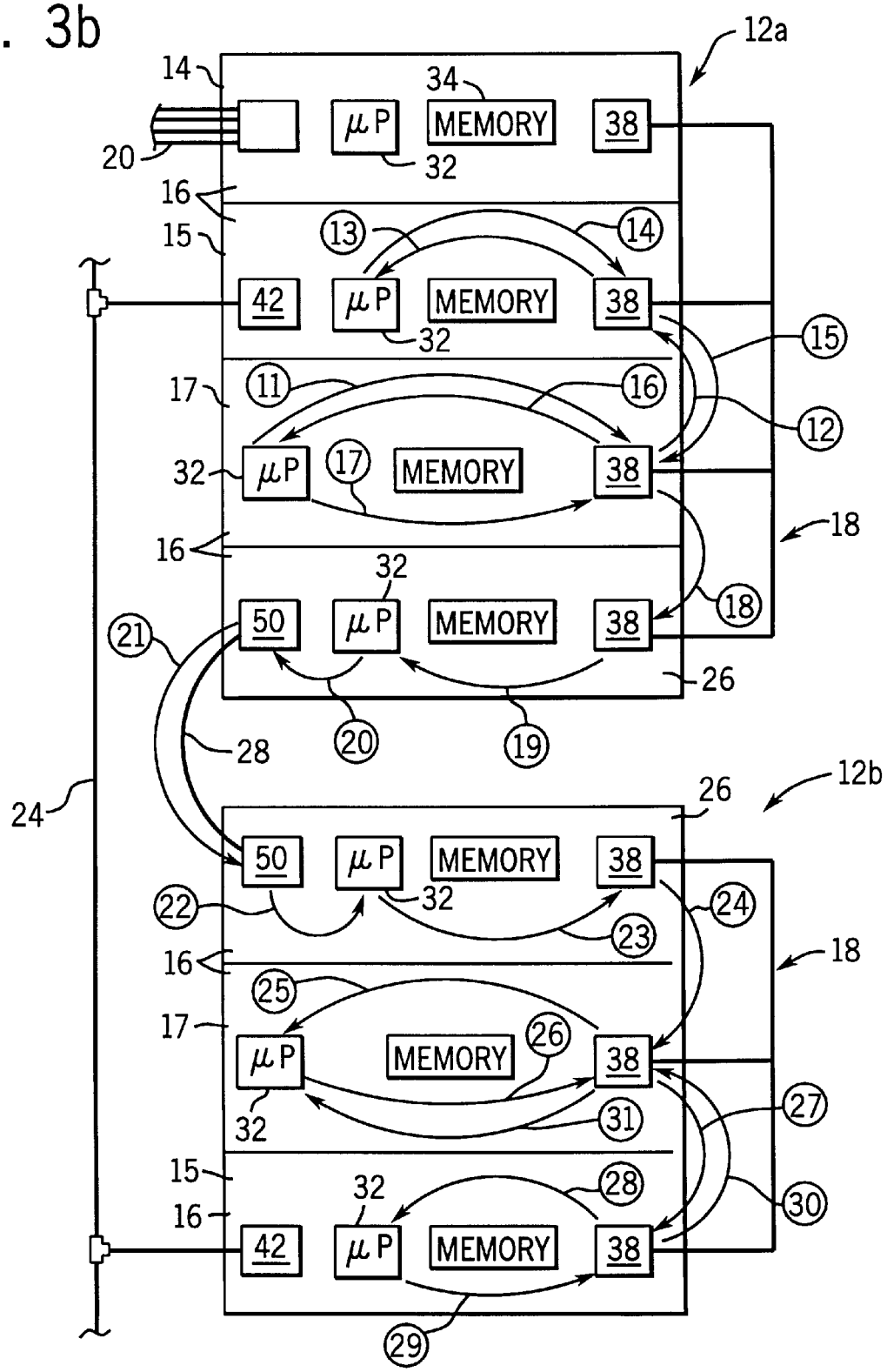

Referring now to FIG. 3b, the processor 32 then, immediately if chassis 12b is present or at a later time when the secondary chassis 12b becomes active, issues a message to the communications module 15 requesting the connection identification number 62 used on the common link 24. To accomplish this, the processor 32 generates the request message and forwards it to the backplane interface circuit 38 as indicated by arrow (11) for transmission over the backplane 18 as indicated by arrow (12) to the backplane interface circuit 38 of the processor module 15.

Arrow (13) indicates the subsequent transmission of the request message to the processor 32 of the communications module 15 which generates a reply including the connection identification number 62 and forwards it to the backplane interface circuit 38 as indicated by arrow (14) for transmission over the backplane 18 as indicated by arrow (15) to the backplane interface circuit 38 of the processor module 17.

Arrow (16) indicates the subsequent transmission of the reply to the processor 32 of the processor module 17 which then generates a new packet containing the connection information for the secondary rack 12b and forwards it to the backplane interface circuit 38 as indicated by arrow (17).

As indicated by arrow (18), the backplane interface circuit 38 transmits the packet to the backplane interface circuit 38 for the system backup module 26 where it is transmitted to the processor 32 as indicated by arrow (19) and transmitted to the link interface circuit 50 as indicated by arrow (20).

The information then proceeds as indicated by arrow (21) on the dedicated link 28 to the system backup module 26 of the secondary rack 12b where it is received by the link interface circuit 50 for the system backup module 26 of rack 12b. As indicated by arrows (22) and (23), the connection information is communicated to the processor 32 of the system backup module 26 and then to its backplane interface circuit 38. After proper conversion to be transmitted on the backplane 18 of rack 12b, the connection information is transmitted to the backplane interface circuit 38 of the processor module 17 of rack 12b as indicated by arrow (24).

Then as indicated by arrow (25), the connection information is transmitted to processor 32 of the processor module 17 where it is used to generate the redundant connection to the communications module 15. The processor generates a secondary open connection message and forwards it to the backplane interface circuit 38 as indicated by arrow (26) for transmission over the backplane 18 as indicated by arrow (27) to the backplane interface circuit 38 of the processor module 15. Arrow (28) indicates the subsequent transmission of the request message to the processor 32 of the communications module 15 which adds the connection identification number 62 to its list. The processor 32 then generates a reply message 60 with a separate connection identification number 62" and sends it to the backplane interface circuit 38 as indicated by arrow (29) for transmission over the backplane 18 as indicated by arrow (30) to the backplane interface circuit 38 of the processor module 17.

Arrow (31) indicates the subsequent transmission of the reply to the processor 32 of the processor module 17 which adds the connection identification number 62" to its memory and allocates appropriate link resources. As in the primary rack 12a, the communications module 15 and the processor module 17 both keep a copy of the connection identification numbers for identifying a connection and its messages.

In conclusion then, all the connections opened by the processor module 17 of the primary rack 12a are reflected over the dedicated link 28 to the secondary rack 12b. Accordingly, if the secondary rack 12b assumes control, it may immediately assume the same connections as those used by the primary rack 12a by using the transmitted connection identification numbers.

At the completion of the opening of all the connections by the processor module 17 of the primary rack 12a, such as may occur upon initiating control of the controlled process or periodically throughout the controlled process, both the memories 34 of the processor module 17 of the primary rack 12a and secondary rack 12b have identical connection lists 45. For seamless transition between the two racks 12, it is also necessary that the I/O table 48 used by the user programs 46 in the two racks 12 be the same. Therefore, as the I/O table 48 in the primary processor of rack 12a changes (during the control process), provision must be made for updating the I/O table 48 of the processor in the secondary rack 12b.

Figure 6:
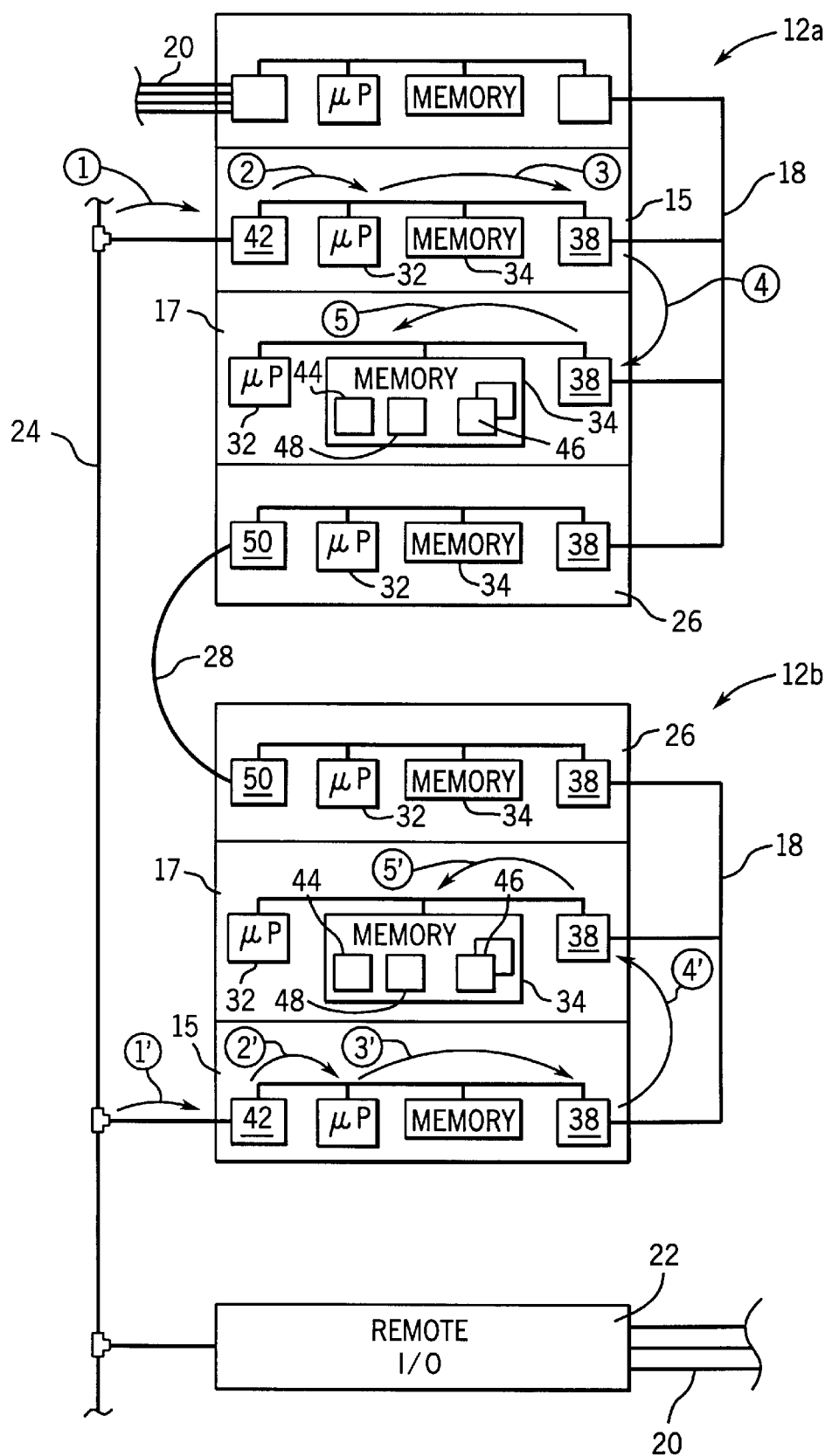
FIG. 6 is a figure similar to that of FIG. 3 showing the paths of data flow during the receipt of data from the remote I/O rack by a control module of the primary rack.

Referring now to FIG. 6, this process or synchronizing the I/0 tables 48 occurs whenever an input data message 60 is received by rack 12a indicated generally by arrow (1) of FIG. 6. Such a message 60, as described above, contains data (the value of an input from the controlled process) together with a connection identification number 62. In the present example, the message 60 comes from the remote I/O rack 22.

The message 60 is received by the link interface circuitry 42 of the communication module 15 in rack 12a and forwarded to the processor 32 of communication module 15 as indicated by arrow (2).

The message 60 is then forwarded as indicated by arrow (3) to the backplane interface circuit 38 of the communication module 15 and transmitted on the backplane 18 to the processor module 17 as indicated by arrow (4). There it is received by the backplane interface circuit 38 and the data is written into the I/O table 48 of the memory as indicated by arrow (5).

Since the communications module 15 in the secondary rack 12b has the connection information, it can also receive the input data message 60 as indicated by arrow (1'). And since the processor module 17 in the secondary rack 12b opened the connection to the communications module 15 over the backplane. The input data can be written into the I/O table 48 in the same manner as was done in the primary chassis. This is shown by arrows (2'), (3'), (4') and (5').

Thus the I/O table 48 of the memory 34 in the secondary rack 12b is kept in coherence with the I/O table 48 of the memory 34 in the primary rack 12a so that it may assume control at a moment's notice.

Since the secondary chassis 12b receives the input data of message 60 which is being sent to the primary chassis 12a, the existence of the backup rack 12b is invisible to the external module such as remote I/O rack 22 and does not require any changes in the user programs 46 as far as the types of connections that are open. The transmission path of connection data and input data may be handled by programming in the modules themselves and need not affect the user programming of the industrial controller as written by application engineers and whose change may be expensive or difficult. Further the common link 24 is not burdened with transmissions of information to the backup rack 12b which is communicated over the dedicated link 28.

The above description describes the communication of connection information to the secondary rack 12b resulting from connections initiated by the processor module 17 in the primary rack 12a in opening a connection to an external module. It will be understood from this description that the same passing through of connection identification numbers may be used when the connection is initiated by an external device opening a connection to the processor module 17 in primary rack 12a. This type of connection would be used by the programming terminal 30 and for peer-to-peer messaging with an external processor module 17 in neither rack 12a nor rack 12b. Similarly a connection may be initiated by an external device to a module other than a processor module 17 for example to a communication module 15 when the communication module is being used as part of a path between one common link 24 and a different common link 24. This type of connection would be used when the primary rack 12a serves as a communication hub or bridge.

Finally this technique of retransmitting connection identification numbers to the secondary modules may also be used when connections are opened between modules on the same rack 12a. For example, one processor module 17 in the primary rack 12a may open a connection to another processor module 17 in the primary rack 12a. This type of connection would be used for peer-to-peer messaging and the connection identification numbers transmitted are those which would be used on the backplane 18. Accordingly, the invention is applicable to a variety of connected messaging situations.

Upon switch-over, the system backup module 26 for the primary rack 12a sends messages to its control modules 16 to system backup module 26b of secondary rack 12b to activate its modules including processor modules 17 which then continues operation of the control program at the beginning of the user program 46 with an up to date I/O table 48 using the connection list previously used by the processor module 17 of the primary rack 12a.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

I claim:

1. A method of providing redundancy in an industrial controller having multiple control modules communicating data on a common link using connected messaging in which a connection identification number unique to a connection between control modules is used to schedule the data and allocate link resources to the transmission of the data, the control modules including a primary and secondary control module providing redundant function, the method comprising the steps of:

(a) establishing a logical connection between a primary control module and another control module, the logical connection associated with a connection identification number;

(b) transmitting the connection identification number from the primary control module to the secondary control module;

(c) prior to a switch-over time, communicating data between the primary control module to the other control module using the connection identification number without transmission of data by the secondary control module using the connection identification number; and (d) after a switch-over time, communicating data between the secondary control module to the other control module using the connection identification number transmitted in step (b) without transmission by the primary control module using the connection identification number;

whereby no new connections need to be opened and no connections need to be closed at the switch-over time.

2. The method of claim 1 wherein the primary control module is a processor module executing a stored program to control a process.

3. The method of claim 1 wherein the primary control module is a communication module and the other control module is a communication module.

4. The method of claim 1 wherein the logical connection is established in the other control module by sending to the primary control module an open connection message.

5. The method of claim 1 whereby the logical connection is established by the primary control module sending to the secondary control module an open connection message.

6. A method of providing redundancy in an industrial controller system having multiple modules communicating data on a common link using connected messaging in which a connection identification number unique to a connection between control modules is used to schedule the data and allocate link resources to the transmission of the data, the modules including a primary and secondary control module providing redundant function, the method comprising the steps of:

(a) establishing a logical connection between a primary control module and another control module, the logical connection associated with a connection identification number;

(b) transmitting the connection identification number from the primary control module to the secondary control module, (c) prior to a switch-over time, communicating data between the primary control module to the other control module using the connection identification number without transmission of data by the secondary control module using the connection identification number; and (d) after a switch-over time, communicating data between the secondary control module to the other control module using the connection identification number transmitted in step (b) without transmission by the primary control module using the connection identification number;

whereby no new connections need to be opened and no connections need to be closed at the switch-over time whereby the logical connection is established by the primary module sending to the other module an open connection message.

7. The method of claim 1 including the step of:

prior to switch-over time, receiving data transmitted from the other control module to the primary control module at the secondary control module using the connection identification number.

8. The method of claim 1 wherein the step (a) of establishing a logical connection between a primary control module and the other control modules includes the steps of:

(i) sending an open message to the other control module;

(ii) receiving a reply message from the other control module including the connection identification number; and wherein step (b) does not occur until step (ii) is complete.

9. An industrial controller comprising:

a common communications link;

multiple control modules programmed generally to communicate on the common link with connected messaging in which a connection identification number unique to a logical connection between control modules is used to schedule data and allocate link resources to the transmission of the data; and programmed specifically to:

(a) establish a logical connection between a primary control module and another control module, the logical connection associated with a connection identification number;

(b) transmit the connection identification number from the primary control module to the secondary control module;

(c) prior to a switch-over time, transmit data from the primary control module to the other control module using the connection identification number without transmission of data by the secondary control module; and (d) after a switch-over time, transmit data from the secondary control module to the other control module using the connection identification number transmitted without transmission by the primary control module;

whereby no new connections need to be opened and no connections need to be closed.

10. The industrial controller of claim 6 including in addition:

(e) first and second local links communicating with the first and second control module respectively;

(f) first and second system back-up modules;

(g) a back-up link and wherein;

the control modules and system back-up modules are further programmed to transmit the connection identification number from the primary control module to the secondary control module by:

(i) transmitting the connection identification number from the primary control module over a local link to a first system back up module; then (ii) transmitting the connection identification number over the back-up link to a second system back-up module; then (iii) transmitting the connection identification number over a local link to the secondary controller;

whereby the common link is not burdened.

11. The industrial controller of claim 9 wherein the control modules are further programmed to:

(d) prior to switch-over time both first and second control modules receive data from the other control module using the connection identification number.

12. The method of claim 1 wherein the programming establishing a logical connection between a primary control module and the other control modules includes the steps of:

(i) sending an open message to the other control module;

(ii) receiving a reply message from the other control module including the connection identification number; and wherein the transmission of the connection identification number from the primary to the secondary does not occur until step (ii) is complete.

* * * * *